United States Patent [19]
Shenberger

[11] 4,312,267
[45] Jan. 26, 1982

[54] IDLER APPARATUS

[75] Inventor: Paul S. Shenberger, New Holland, Pa.

[73] Assignee: Sperry Corporation, New Holland, Pa.

[21] Appl. No.: 135,956

[22] Filed: Mar. 31, 1980

[51] Int. Cl.³ .......................... B30B 1/00; F16H 7/12
[52] U.S. Cl. .................................. 100/179; 474/118; 474/133; 474/135
[58] Field of Search ................ 100/179; 474/133, 135, 474/138, 117, 118; 192/11, 106.2

[56] References Cited
U.S. PATENT DOCUMENTS 4,121,475  10/1978  McIlwain ........................... 474/135

FOREIGN PATENT DOCUMENTS 512036  6/1952  Belgium ............................ 474/135
411426  8/1945  Italy .................................... 474/135

Primary Examiner—Peter Feldman
Attorney, Agent, or Firm—James R. Bell; Frank A. Seemar

[57] ABSTRACT

Idlers used in the main drive chain on rectangular balers resist the accumulation of slack in the chain. Sudden stops of the drive apparatus cause the chain to be highly tensioned resulting in possible damage to the idler and the chain. An idler apparatus is provided with a first resilient member having a first spring rate for limiting the accumulation of slack in the chain. A second resilient member has a second spring rate for resisting tensioning of the chain.

6 Claims, 4 Drawing Figures

IDLER APPARATUS

BACKGROUND OF THE INVENTION

This invention relates generally to presses and, more particularly, to reciprocating press construction of the box and piston type such as, for example, rectangular balers.

Some rectangular balers, which are towed vehicles, derive their operating power from a power take-off shaft connected to the towing vehicle, such as an agricultural tractor. The power take-off shaft provides power to a main drive gearbox which in turn directly drives a plunger and, by means of a drive element, such as a chain or belt or the like, a drive member off the gearbox translates power to a driven member to operate the feeder, knotter and pickup functions of the baler. Thus, significant inertial energy is translated via the drive element from the drive member to the driven member.

With such inertial energy present, should the drive member suddenly stop because, for example, the baler plunger strikes a foreign object or because the crank arm strikes a needle safety latch due to the mistiming of the feeder, the translated inertial energy causes the driven member to overrun the drive member. As a result, the normally slack side of the chain is snapped taut resulting in premature chain failures or causing the idler mechanism to bottom out and possibly be damaged. The idler is able to bottom out under these conditions since the single spring normally used in such idler mechanisms is a relatively light spring provided only to limit slack in the chain or belt.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an idler apparatus including first and second resilient members. The first resilient member has a first spring rate for limiting the accumulation of slack in the chain. The second resilient member has a second spring rate for resisting tensioning of the chain.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
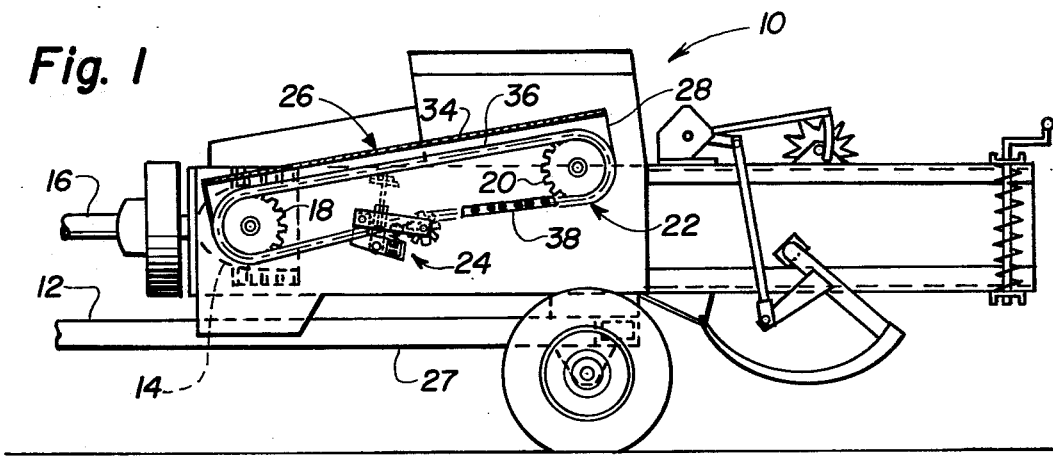
FIG. 1 is a side elevational view illustrating a baler including an embodiment of the idler apparatus of this invention.

A rectangular baler is designated 10 in FIG. 1 and includes a drawbar 12 for connecting a towing vehicle (not shown) such as an agricultural tractor. The tractor not only tows baler 10 but supplies a source of power to a main drive gearbox 14 through a power take-off (PTO) shaft 16.

A drive member, such as a sprocket 18, derives power from the gearbox 14 and translates power to a driven member, such as a sprocket 20, by means of a continuous member, such as main drive chain 22. In this manner, other power consuming components of the baler, such as the feeder, knotter and pickup, are driven.

In FIGS. 1, 2, 3 and 4, an idler apparatus generally designated 24 is connected to a supportive frame member 26 which is a guard for the chain 22 and sprockets 18,20. Member 26 is ultimately connected to and supported by the main frame 27 of baler 10. Member 26 includes a substantially planar portion 28 having a first side 30 adjacent sprockets 18,20 and a second opposite side 32. A lip portion 34 overhangs a first portion 36 of main drive chain 22. Idler apparatus 24 engages a second portion 38 of main drive chain 22.

Idler apparatus 24 includes a first adjustment member 40 and a second adjustment member 42. First adjustment member 40 is preferably a steel arm pivotally connected at a first end 44 adjacent first side 30 of member 26 by a bolt 46, or the like. An idler member 48, preferably a sprocket type wheel, is suitably connected to a second end 50 of first adjustment member 40 by a bolt 52 or the like so as to rotate relative to second end 50 when urged into engagement with chain 22.

Second adjustment member 42 is also preferably a steel arm pivotally connected at a first end 54 adjacent first side 30 of member 26 by the bolt 46. Note, however, in FIGS. 3 and 4, that second member 42 is mounted immediately adjacent side 30 whereas first member 40 is spaced from second member 42 by means of a suitable bushing 55 or the like. The reason for such spacing between members 40,42 will be explained later in detail. Thus, members 40,42 are movable relative to frame 26, to chain 22 and are movable relative to each other.

A steel plate 56 is preferably welded to a side 58 of member 40 adjacent second end 50. Plate 56 is of a construction sufficient to support a bolt passing therethrough. Another steel plate 60 is preferably welded to a side 62 of member 42 adjacent a second end 64 of member 42. Side 58 is adjacent to and spaced from side 62 as provided by bushing 55. Plate 60 is also of a construction sufficient to support a bolt passing therethrough. A bolt 66 extends from a head end 68 through plate 56 and through plate 60 and is secured at plate 60 by a nut 70 or the like.

A first resilient means, such as a steel coil spring 72 is retained between plates 56,60 and maintained substantially concentrically aligned with bolt 66. Spring 72 is compressed between plates 56,60 for urging idler member 48 in a first direction indicated by the arrow designated 74. In this manner, idler member 48 is urged into engagement with chain 22. Spring 72 has a length of about 3 11/16 inches and has a spring rate of about 600 pounds per inch sufficient for resisting the accumulation of slack in chain 22.

A second resilient means, such as a steel coil spring 76 is of a smaller diameter than spring 72, is of a shorter length than spring 72, and has a higher spring rate, than spring 72. Spring 76 is also retained between plates 56,60 but is of such a length, about 3 3/16 inches, that when spring 72 is compressed for urging idler member 48 against chain 22, spring 76 is normally at rest and is not compressed. Spring 76 is also maintained substantially concentrically aligned between bolt 66 and larger diameter spring 72. In this manner, springs 72,76 and bolt 66 are substantially concentrically aligned between plate 56,60 in the previously described space provided between adjustment members 40,42. Thus, spring 76 has a spring rate of about 2300 pounds per inch which is sufficient for resisting sudden tensioning of chain 22 and resultant component damage.

Figure 4:
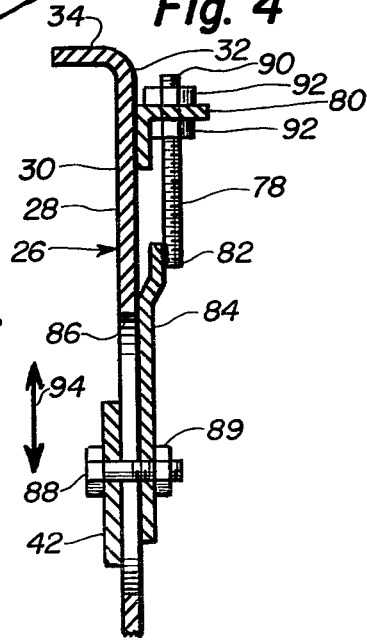
FIG. 4 is a partial end view illustrating an embodiment of the idler apparatus as viewed from line IV—IV of FIG. 2.

Means, such as an adjustment rod 78, best shown in FIG. 4, is connected for adjustably moving adjustment member 42 relative to adjustment member 40, for compressing spring 72 a predetermined distance between plates 56,60, for urging idler member 48 into engagement with chain 22 and for limiting the accumulation of slack in chain 22. By predetermined distance is meant a distance sufficient to limit slack in chain 22 without compressing spring 76. Rod 78 is preferably a threaded steel rod extending through a steel plate 80 which is welded to side 32 of frame member 26. An end 82 of rod 78 is preferably welded to a steel plate 84 which overlaps a slot 86 formed in frame member 26. A bolt 88 extends through adjustment member 42, through slot 86 and through plate 84 where it is secured by a nut 89. Another end of rod 78 is adjustably secured to plate 80 by means of a pair of nuts 92. Thus, it can be seen that adjustment of nuts 92 on rod 78 acting with plate 80 can move member 42 in the directions indicated by the arrowheads designated 94.

Figure 2:
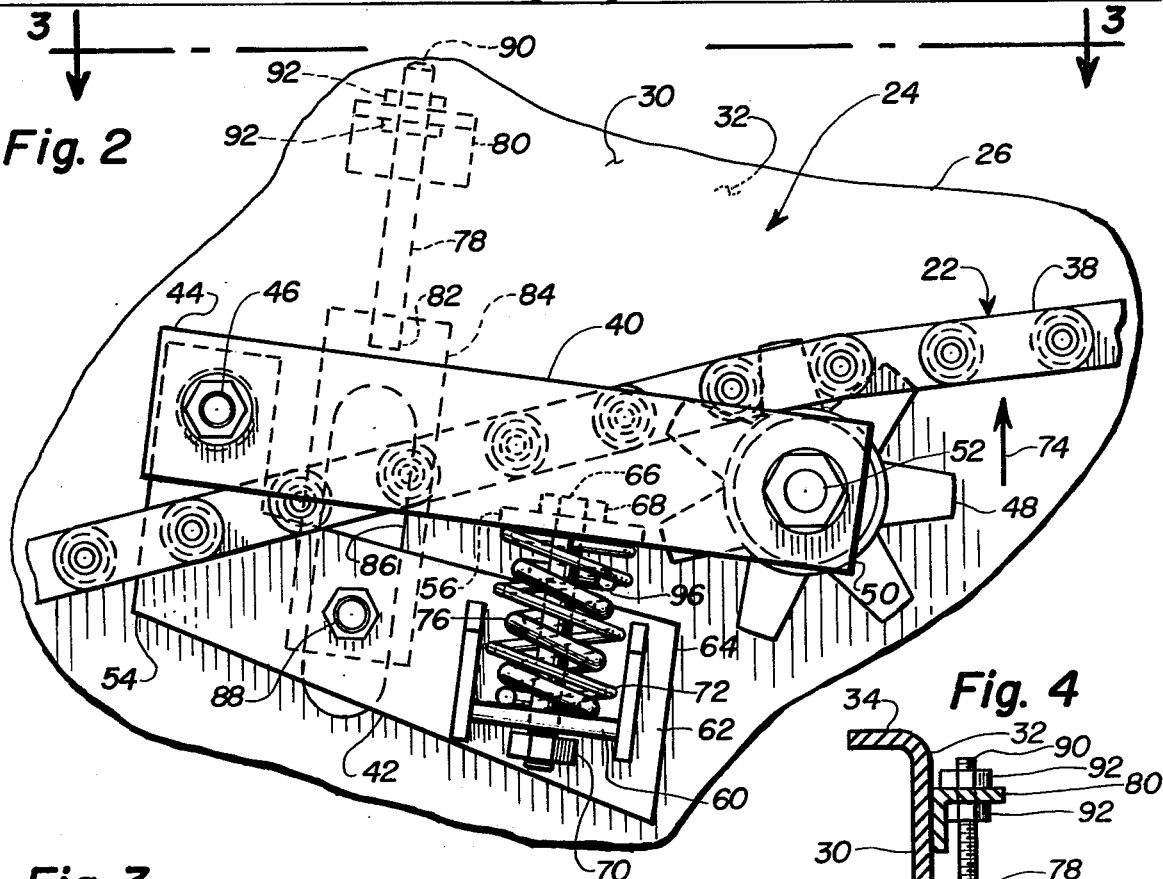
FIG. 2 is a partial side elevational view illustrating an embodiment of the idler apparatus of this invention.
Figure 3:
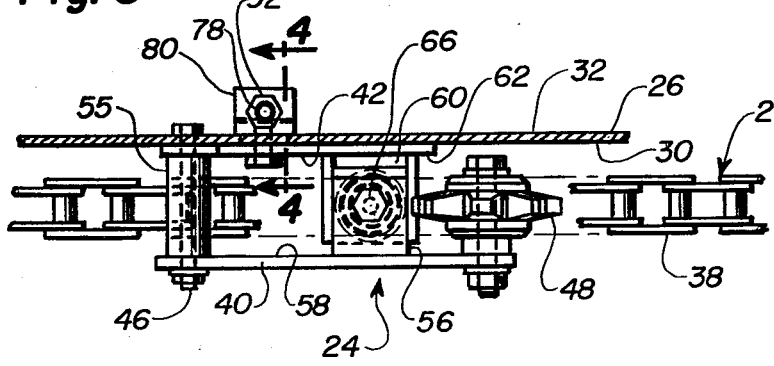
FIG. 3 is a partial top view illustrating an embodiment of the idler apparatus as viewed from line III—III of FIG. 2.

With the parts assembled as set forth above, it can be seen that with spring 72 compressed on bolt 66 between plates 56,60 and spring 76 relaxes on bolt 66 as illustrated in FIG. 2, rod 78 is adjusted by rotating nuts 92 acting with plate 80 for either increasing or decreasing compression of spring 72 thus moving adjustment member 42 thus urging idler member 48 for adjusting tension on chain 22. Preferably, chain 22 is tensioned until end 96 of spring 76 is a predetermined distance of about ⅛ inch out of contact with adjustment member 40. In the event that driven sprocket 20 overruns drive sprocket 18 causing second portion 38 of chain 22 to be drawn taut thus deflecting idler member 48, energy resulting from such deflection can be absorbed when idler member 48 and adjustment member 40 are deflected a distance sufficient to simultaneously compress both springs 72,76. Thus, damage to any components is substantially limited.

The foregoing has described an idler apparatus for resisting the accumulation of slack in a drive chain and for resisting sudden tensioning due to stopping of the chain.

It is anticipated that aspects of the present invention, other than those specifically defined in the appended claims, can be obtained from the foregoing description and the drawings.

Having thus described the invention, what is claimed is:

1. An idler apparatus comprising:
   (a) a driving member connected to a supportive frame;
   (b) a driven member;
   (c) a continuous member operatively connecting the driving and driven members;
   (d) an arm member;
   (e) an idler member connected to the arm member and engaged with the continuous member;
   (f) first resilient means connected for urging the idler member in a first direction into engagement with the continuous member, the first resilient means having a first spring rate for limiting the accumulation of slack in the continuous member;
   (g) second resilient means having a second spring rate greater than the first spring rate, the second resilient means connected for limiting movement of the idler member in a second direction, opposite the first direction for resisting tensioning of the continuous member; and
   (h) the arm member being movable from one position where it engages the first resilient means but is spaced from the second resilient means to another position where it engages both the first and second resilient means in response to sudden tension in the continuous member.

2. The apparatus of claim 1 wherein said first resilient means has a first length and said second resilient means has a second length less than said first length.

3. An idler apparatus comprising:
   (a) a driving member connected to a supportive frame;
   (b) a driven member;
   (c) a continuous member operably connecting the driving and driven members;
   (d) a first adjustment member pivotally connected to the frame;
   (e) an idler member connected to the first adjustment member;
   (f) a second adjustment member pivotally connected to the frame;
   (g) a first spring mounted between the first and second adjustment members; said first spring having a first length and having a first spring rate;
   (h) a second spring mounted between the first and second adjustment members, said second spring having a second length, less than said first length and having a second spring rate, greater than said first spring rate;
   (i) the second adjustment member being movable relative to the first adjustment member, for compressing the first spring a predetermined distance, for urging the idler member in a first direction into engagement with the continuous member and for limiting the accumulation of slack in the continuous member;
   (j) the second spring connected for limiting movement of the idler member in a second direction opposite the first direction for resisting tensioning of the continuous member; and
   (k) the first adjustment member being movable from one position where it engages the first spring but is spaced from the second spring to another position where it engages both the first and second springs in response to sudden tension in the continuous member.

4. In combination with a baler having a main drive gearbox mounted on a supportive frame, an idler apparatus comprising:
   (a) a driving member connected to the frame and operably connected to the main drive gearbox;
   (b) a driven member;
   (c) a continuous member operably connecting the driving and driven members;

(d) an arm member;

(e) an idler member connected to the arm member and engaged with the continuous member;

(f) first resilient means connected for urging the idler member in a first direction into engagement with the continuous member, the first resilient means having a first spring rate for limiting the accumulation of slack in the continuous member;

(g) second resilient means having a second spring rate greater than the first spring rate, the second resilient means connected for limiting movement of the idler member in a second direction, opposite the first direction for resisting tensioning of the continuous member; and (h) the arm member being movable from one position where it engages the first resilient means but is spaced from the second resilient means to another position where it engages both the first and second resilient means in response to sudden tension in the continuous member.

5. The idler apparatus of claims 1 or 4, wherein the first resilient means comprises a first spring and the second resilient means comprises a second spring.

6. The idler apparatus of claim 5, wherein the second spring is disposed concentrically within the first spring.

* * * * *